United States Patent [19]
Amos et al.

[11] Patent Number: 4,893,388
[45] Date of Patent: Jan. 16, 1990

[54] METHOD OF MODIFYING TURBINE ROTOR DISCS

[75] Inventors: Dennis R. Amos, Rock Hill, S.C.; Robert E. Clark, Orlando; Roger W. Heinig, Cocoa Beach, both of Fla.; Stephen R. Reid, Newark, Del.

[73] Assignee: Westinghouse Electric Corp., Pittsburgh, Pa.

[21] Appl. No.: 281,136

[22] Filed: Dec. 8, 1988

[51] Int. Cl.⁴ .............................................. B21K 3/04
[52] U.S. Cl. .......................... 29/156.8 R; 29/156.8 B; 29/156.8 T; 29/402.13; 29/527.4; 228/119; 228/182
[58] Field of Search ................. 29/156.8 R, 156.8 B, 29/156.8 T, 402.13, 402.16, 402.18, 527.4; 228/119, 182

[56] References Cited

U.S. PATENT DOCUMENTS

| | | | |
|---|---|---|---|
| 4,050,133 | 9/1977 | Cretella et al. | 29/156.8 B |
| 4,098,450 | 7/1978 | Keller et al. | 228/119 |
| 4,128,929 | 12/1978 | DeMusis | 29/156.8 B |
| 4,141,127 | 2/1979 | Cretella et al. | 29/156.8 B |
| 4,291,448 | 9/1981 | Cretella et al. | 29/156.8 B |
| 4,563,801 | 1/1986 | Schill et al. | 29/156.8 B |
| 4,566,810 | 1/1986 | Yoshioka et al. | 384/280 |
| 4,611,744 | 9/1986 | Fraser et al. | 228/119 |
| 4,621,762 | 11/1986 | Bronowski | 228/215 |
| 4,633,554 | 1/1987 | Clark et al. | 29/156.4 R |
| 4,726,101 | 2/1988 | Draghi et al. | 29/156.8 B |

FOREIGN PATENT DOCUMENTS 59-056526 4/1984 Japan .
2091140A 7/1982 United Kingdom .

Primary Examiner—P. W. Echols
Assistant Examiner—K. Jordan
Attorney, Agent, or Firm—K. Bach

[57] ABSTRACT

A method for modifying an original blade supporting disc (8) which is integral with a turbine rotor (2), and which has an original outline, in order to create a modified disc (8) which has an outline different from the original outline and which provides a blade-supporting region (10) of increased size, including the steps of:

machining away portions (14,16) of the original disc (8) which protrude beyond the outline of the modified disc (8);

building up the original disc (8) with weld metal past the outline of the modified disc (8) at all locations (14,20) where the outline of the original disc (8), after the machining step, is enclosed by the outline of the modified disc (8); and machining away parts of the weld metal to the outline of the modified disc (8).

10 Claims, 1 Drawing Sheet

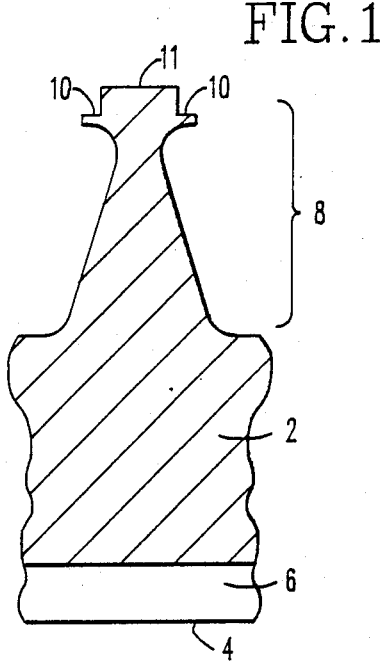
FIG. 1
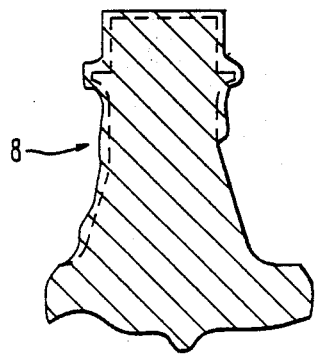
FIG. 2
FIG. 3

METHOD OF MODIFYING TURBINE ROTOR DISCS

BACKGROUND OF THE INVENTION

The present invention relates to turbine rotors having integral blade-supporting discs, and particularly to a method for modifying such discs to accommodate a replacement turbine blade requiring a disc having a wider blade supporting area than that required by the original blade.

Certain turbines which are already in service are constructed to have blade supporting discs which are integral with the turbine rotor. In a number of turbines of this type, problems have been encountered with respect to the fastening of some of the blades to their associated discs. One solution to these problems is to replace an existing blade with a new blade which is wider and stronger than the original blade and which requires a disc having a wider blade supporting region.

Conceivably, the necessary modification could be made by cutting off the existing disc as close as possible to its inner extremity and then welding on a new disc. This procedure would be extremely complicated because the disc must be manufactured in two halves in order to be placed around the rotor, and then must be welded to the rotor at a relatively inaccessible location.

A second possibility would involve cutting off the affected rotor end and then welding a new forging in place of the removed portion. This procedure is disadvantageous because such a new forging would be very expensive, given that it would probably include other rows of discs which must be machined and rebladed, certain delays would be encountered in obtaining the new forging, and costly accessory equipment must be obtained for positioning the forging relative the remainder of the rotor during welding.

SUMMARY OF THE INVENTION

It is a primary object of the present invention to modify the configuration of a blade supporting disc which is integral with a rotor in a comparatively simple and inexpensive manner.

Another object of the invention is to achieve such modification by removing a minimum amount of material from the original disc.

The above and other objects are achieved, according to the present invention, by a method for modifying an original blade supporting disc which is integral with a turbine rotor, and which has an original outline, in order to create a modified disc which has an outline different from the original outline and which provides a blade-supporting region of increased size, comprising:

machining away portions of the original disc which protrude beyond the outline of the modified disc;

building up the original disc with weld metal past the outline of the modified disc at all locations where the outline of the original disc, after the machining step, is enclosed by the outline of the modified disc; and machining away parts of the weld metal to the outline of the modified disc.

BRIEF DESCRIPTION OF THE DRAWINGS

FIG. 1 is a cross-sectional, detail view of a portion of a turbine rotor with an integral blade supporting disc.

FIG. 2 is a cross-sectional, detail view of a portion of the structure shown in FIG. 1, illustrating the manner in which the disc of FIG. 1 would be modified in accordance with invention.

FIG. 3 is a cross-sectional view similar to that of FIG. 2, illustrating an intermediate stage in the practice of the method according to the present invention.

DESCRIPTION OF THE PREFERRED EMBODIMENTS

FIG. 1 shows a portion of a turbine rotor 2 having a central axis 4, about which the rotor is mounted to rotate, and having an axial bore 6 concentric with axis 4. Rotor 2 is provided, at its periphery, with an integral blade-supporting disc 8 having seal-supporting flanges 10 and a blade-supporting base 11. Disc 8 is constructed to be connected to the root of a selected turbine blade and is one of several discs distributed axially along rotor 2.

If it should prove necessary to replace the original turbine blade with a more rugged blade having a larger dimension parallel to axis 4 and requiring a disc which is larger in that direction, it would be highly desirable to have the possibility of providing such modified disc without replacing the entire rotor or a substantial section thereof.

According to the present invention, the desired modification is made simply by machining away relatively small portions of disc 8, building up added portions, by suitable welding procedures, to provide the material needed for the modified disc, and then machining the built-up portions to arrive at the final configuration of the modified disc.

This process can be easily carried out in such a manner as to shift the central plane of the disc, which plane is perpendicular to axis 4, in order to provide added spacing at the entrance side or the exit side of the associated blading. This is advantageous because it provides, for example, an increased rotor space between the new, larger blade and the blade upstream or downstream thereof.

FIG. 2 illustrates the manner in which a disc is modified according to the present invention. The original disc is constituted by portions 12, 14 and 16, all forming an integral part of the rotor body. To produce a modified disc having a larger blade supporting region and having a center line which is shifted toward the inlet end of the turbine, i.e. toward the left in FIG. 2, portions 14 and 16 are machined away and then portions 18 and 20 are added by build-up of weld metal, followed by machining to arrive at the desired final configuration represented in FIG. 2 by portions 12, 18 and 20.

After machining away of portions 14 and 16, portion 12 is built up by a welding procedure to initially give disc 8 the form shown by the solid line outline in FIG. 3. Then, by machining operations, excess metal is cut away to give disc 8 the final, modified form, the outline of which is illustrated by broken lines in FIG. 3.

The buildup of weld metal can be effected in a variety of ways. Firstly, the large volume portions, except for the outer surface of the resulting disc which is exposed to higher service stresses and a hostile environment, should preferably be deposited by a submerged arc or gas metal arc weld process. Both of these processes are characterized by relatively high deposition rates. Then, the regions which will constitute the exposed surfaces of the modified disc are preferably built up by a gas tungsten arc weld process which, although being relatively slow, produces a weld having exceptionally good mechanical properties.

During performance of the submerged arc or gas metal arc weld process, the rotor must be positioned so that its axis is oriented vertically.

Alternatively, the entire weld build up can be effected by the gas tungsten arc weld process. When this process is employed, not only does the entire weld have exceptionally good mechanical properties, but it is not necessary to move the rotor to bring its axis to a vertical orientation.

It will be noted from a consideration of FIG. 2 that the process according to the present invention involves replacing both blade fastening flanges by weld metal and that both disc side faces, below the flanges, are given less of a taper, so that this portion of the disc is strengthened.

According to one practical embodiment of the invention, a disc 8 which originally supported a blade having a root width of the order of 10 cm can be modified to support a blade having a root width of the order of 14 cm.

While the description above identifies particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for modifying an original blade supporting disc which is integral with a turbine rotor, and which has an original outline, in order to create a modified disc which has an outline different from the original outline and which provides a blade-supporting region of increased size, the original disk having at least one portion which must be removed in order to create the modified disc, comprising:
   machining away each said portion of the original disc;
   building up the original disc with weld metal past the eventual outline of the modified disc at all locations where the outline of the original disc, after said machining step, is to be enclosed by the outline of said modified disc; and
   machining away parts of the weld metal to the outline of the modified disc.

2. A method as defined in claim 1 wherein the modified disc has a blade-supporting base and said step of building up is carried out to form the entire cross section of the base.

3. A method as defined in claim 2 wherein the rotor has an axis, the original disc and the modified disc each have a center plane which extends perpendicular to the rotor axis, and the center planes are offset from one another in the direction parallel to the rotor axis.

4. A method as defined in claim 3 wherein said step of building up is carried out by a gas tungsten arc welding process.

5. A method as defined in claim 3 wherein said step of building up includes firstly providing a large volume of weld metal on at least one location;
   by performing a submerged arc or gas metal arc welding process to supply at least a substantial portion of said large volume, and secondly, performing a gas tungsten arc welding process to supply metal for the outer surface of the modified disc.

6. A method as defined in claim 2 wherein said step of building up is carried out by a gas tungsten arc welding process.

7. A method as defined in claim 2 wherein said step of building up includes firstly providing a large volume of weld metal on at least one location;
   by performing a submerged arc or gas metal arc welding process to supply at least a substantial portion of said large volume and secondly performing a gas tungsten arc welding process to supply metal for the outer surface of the modified disc.

8. A method as defined in claim 1 wherein the original disc and the modified disc each have a center plane, which extends perpendicular to the rotor axis and the center planes are offset from one another in the direction parallel to the rotor axis.

9. A method as defined in claim 1 wherein said step of building up is carried out by a gas tungsten arc welding process.

10. A method as defined in claim 1 wherein said step of building up includes firstly providing a large volume of weld metal on at least one location;
   by performing a submerged arc or gas metal arc welding process to supply at least a substantial portion of said large volume, and secondly, performing a gas tungsten arc welding process to supply metal for the outer surface of the modified disc.

* * * * *